United States Patent [19]

Hamilton

[11] 3,727,022
[45] Apr. 10, 1973

[54] ELECTROMAGNETIC HEATING AND SEALING

[75] Inventor: Peter W. Hamilton, Cincinnati, Ohio

[73] Assignee: The Procter & Gamble Company, Cincinnati, Ohio

[22] Filed: July 17, 1972

[21] Appl. No.: 272,234

[52] U.S. Cl. ............219/10.43, 156/272, 219/10.49, 219/10.53, 219/10.57, 219/10.67, 219/10.79
[51] Int. Cl. ................................................H05b 5/08
[58] Field of Search.............219/8.5, 10.41, 10.43, 219/10.49, 10.53, 10.57, 10.67, 10.79; 156/272, 275, 380

[56] References Cited

UNITED STATES PATENTS

| | | |
|---|---|---|
| 2,426,053 | 8/1947 | Robends............................219/10.43 |
| 2,462,336 | 8/1969 | Leatherman..................219/10.43 X |
| 3,549,440 | 12/1970 | Adcock et al. ........................156/272 |
| 3,397,295 | 8/1968 | Hale....................................219/8.5 |

Primary Examiner—R. F. Staubly
Assistant Examiner—B. A. Reynolds
Attorney—Richard C. Witte

[57] ABSTRACT

A method and apparatus for electromagnetically (i.e., induction) heating and sealing materials, as exemplified by a laminated collapsible dispensing tube body having metallic and polymeric layers therein, the metallic layer being circumferentially discontinuous (i.e., having a seam) and a thermoplastic closure therefore, is provided. The prior art difficulties resulting from the discontinuity in the metallic layer are overcome by the provision of shielding, either alone or in combination with means for focusing the electromagnetic energy.

9 Claims, 5 Drawing Figures

PATENTED APR 10 1973  3,727,022

ELECTROMAGNETIC HEATING AND SEALING

BACKGROUND OF THE INVENTION

This invention relates to electromagnetic heating and sealing and in particular to a method and apparatus for sealing by induction heating in applications wherein electrical discontinuities in the susceptor have heretofore precluded the simple application of electromagnetic sealing.

It has long been known that heat may be created in a conductive material by providing a current therein. In an electromagnetic heating device; i.e., an induction heater, such a current results from providing a varying magnetic field which passes through a conductive material which is susceptible to having currents induced therein thereby. Hence the metallic materials so used are referred to as susceptors. In U.S. Pat. No. 2,620,425 issued Jan. 5, 1950 to Karl Seiler, 3rd., the induction heating technique is used to heat a metallic can body and the solder thereon and thus seal the can wall to a top and/or bottom piece.

It is also known that a metallic tube with a longitudinal seam may be welded along that seam by passing said tube perpendicularly through the aperture in a current carrying magnetic field producing coil. In this application, the current which is induced in said tube is concentrated along said seam. This effect is illustrated in U.S. Pat. No. 3,472,987 issued Oct. 14, 1969 to Fernand Viart wherein a plurality of such coils are used in a particular array.

The fact that induced currents and heat are concentrated along such a seam, while advantageous in some applications, has heretofore presented problems in others. In forming the seals at either end of a laminated collapsible dispensing tube, the body of which comprises one or more layers of metallic foils and polymers; i.e., in providing a lower fin-type seal and in adhering the body to a polymeric endpiece (neck and shoulder), heating of the longitudinal seam is undesirable. This heating can, for instance, result in noticeable overheating and discoloration of the polymer disposed along the longitudinal seam. This problem has been partially solved with respect to forming the bottom fin-type seal in such a tube by the apparatus of U.S. Pat. No. 3,424,885 issued Jan. 28, 1969 to Karl Garney et al. which utilizes physical separation of the inducing coil and the longitudinal seam to prevent overheating of said seam.

Heretofore electromagnetic heating has not been generally used to provide the seal between the laminate body and the polymeric endpiece of a laminate collapsible dispensing tube because of the aforementioned difficulties. The approach taken in the Garney et al. patent is inapplicable to this problem as the entire circumference of a tube must be heated to melt the polymer in the laminate, thus adhering it completely about the endpiece. In all known prior art uses of electromagnetic heating and sealing in applications of the type herein described, an indirect approach has been used. Specifically, the coil which produces the electromagnetic field has been placed adjacent the tube exterior at a single point along the line wherein sealing is to be effected. Sealing can, in this way, be effected at that point substantially irrespective of the presence of a seam. The coil can then be moved along the line wherein sealing is to be effected (or the tube body moved relative to the coil) and the entire seal thereby effected. Obviously, this prior art approach is more complicated and time consuming than that of the present invention wherein, with proper shielding, the entire seal is formed at one time and without relative movement between the tube and the coil. In addition, the prior art technique is not well adapted to effect the sealing between a tube having a non-round transverse cross section and a similarly shaped shoulder, due to the complexities of maintaining suitable spacing between the tube and coil which are moving with respect to one another.

Accordingly it is an object of this invention to provide a method and apparatus for electromagnetically heating and sealing a laminated tube body having a metallic layer and a polymeric layer, said metallic layer having a circumferential discontinuity therein to a thermoplastic endpiece or the like.

It is another object of this invention to provide such a method and apparatus wherein said tube body need not be moved relative to the coil of the apparatus.

It is a further object of this invention to provide a method and apparatus for effecting such sealing which is adapted for use with tubes having non-round transverse cross section.

SUMMARY OF THE INVENTION

These and other objects are achieved by a method which includes placing a tube body having a layer of metallic material and a layer of polymeric material therein, said metallic layer having a circumferential discontinuity therein, in the desired relationship with the endpiece and shielding the portion of the body away from said endpiece with a conductive shield. Heat is applied to said metallic material in the region of said endpiece by means of an induction heating apparatus having a coil encircling said region. The heat induced in said metallic material will melt said polymeric material and fuse it to said endpiece. An apparatus with which to practice the above method is also provided.

BRIEF DESCRIPTION OF THE DRAWINGS

Although the specification concludes with claims particularly pointing out and distinctly claiming the subject matter regarded as forming the present invention, it is believed the invention will be better understood from the following description taken in connection with the accompanying drawings in which:

DESCRIPTION OF THE PREFERRED EMBODIMENT

Figure 1:
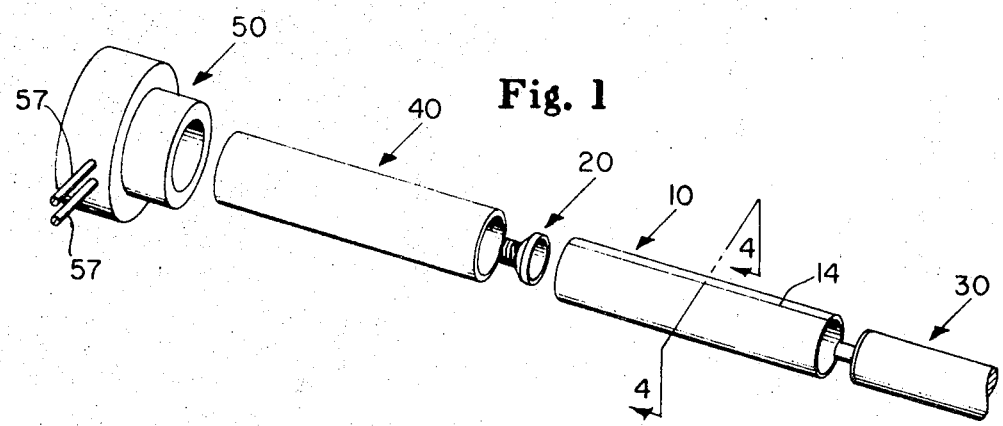
FIG. 1 is an exploded view showing the relationship and order of assembly of the tube body, tube end and the apparatus of the present invention.

Referring now to the drawings, FIG. 1 is an exploded perspective view of a preferred apparatus of the present invention, showing the relationship of the apparatus to the workpiece. Although the methods and apparatus of the present invention can be used to advantage in assembling a variety of tubular structures to endpieces, this description will be limited to the assembly of a collapsible dispensing tube such as a toothpaste tube. The utility of the present invention in any application wherein it is desired to secure an endpiece to a tubular body having a metallic layer and an inner thermoplastic layer and wherein the metallic layer has a circumferential discontinuity will be readily apparent from such a description. Such a tubular body will hereinafter be referred to as "a tube" or "the tubes" for clarity and simplicity.

Figure 4:
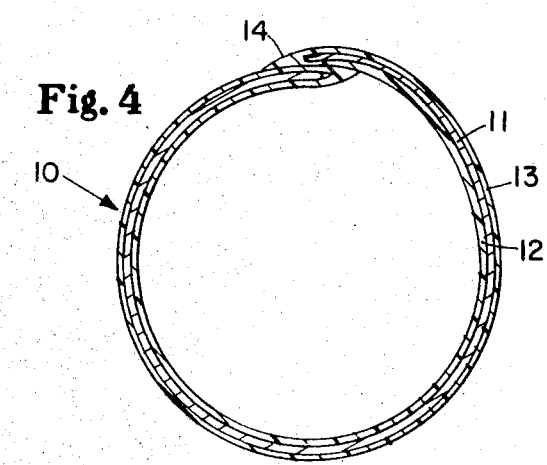
FIG. 4 is a cross sectional view of one type of laminate collapsible tube body (viewed along line 4—4 in FIG. 1) which can be used with the present invention.

A tube, designated generally by the numeral 10 is shown in FIG. 1 and is to be joined to the endpiece which is designated generally by the numeral 20. FIG. 4 is a transverse cross sectional view of the tube 10 taken along the line 4—4 in FIG. 1. As can be seen, the tube 10 consists of a metallic layer 11, which is typically aluminum about 0.5–5 mils thick, and polymeric layers 12 and 13. The inner polymeric layer 12 will typically be polyethylene or the like about 1–4 mils thick and serves to protect the metallic layer 11 from attack by the product to be stored in the completed tube. The polymer 12 can be extrusion coated onto the metallic layer 11 or thermoplastic adhesives, well known in the art, can be used to secure sheets of polymer and the metallic layer 11. Commonly, an outer layer of polymer 13 is secured over the metallic layer 11. Such a layer can be identical to the inner polymeric layer 12 and serves to protect the metallic layer against oxidation. Often, printing will be applied to the metallic layer 11, either directly or in the form of an additional layer of material. In either case, the polymeric layer 13 also serves to protect the printing from abrasion. The tube 10 is generally formed about a mandrel and the seam 14 is secured by applying heat and pressure which partially melts and bonds the polymeric layers 12 and 13 in the region of said seam. The presence of one or more polymeric layers in the tube 10 results in a circumferential discontinuity in the metallic layer 11 of the tube giving rise to the aforementioned problems when securing the tube to the endpiece 20.

Figure 5:
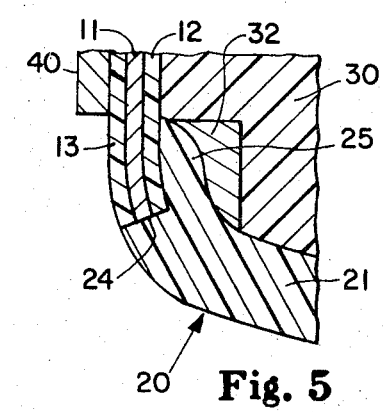
FIG. 5 is a detailed cross sectional view of the tube wall-shoulder juncture which is shown more generally in FIG. 4.

A common and preferred juncture between the tube 10 and endpiece 20 is shown in detail in FIG. 5. The endpiece 20 includes a generally radially extending shoulder 21 which transits into an annular skirt 25. A recessed marginal area 24 in the skirt 25 is sized so as to accommodate the tube 10 and thereby provide a smooth flush transition from the tube 10 to the shoulder 21. The endpiece 20 also includes a dispensing orifice 22 with threads 23 thereon as shown most clearly in FIG. 3. The threads 23, in the completed and filled tube are used to engage a closure; i.e., a cap (not shown).

The seal between the tube 10 and headpiece 20 is effected by heating the inner layer of polymer 12 and thereby fusing it to the endpiece 20. Although such heating can be accomplished in a variety of ways, the present invention is directed to applications wherein the heating is accomplished by electromagnetically inducing current, and thereby heat, in the metallic layer 11. This heat is then conducted into the inner polymer layer 12.

Returning to FIG. 1, a mandrel, designated generally by the numeral 30 and of a transverse cross section generally matching the interior of the tube 10, is inserted into the tube 10 before or after forming the seam 14 therein. The mandrel 30 is preferably made of material having a low specific heat and a low thermal conductivity in order to avoid its absorbing substantial quantities of heat during the formation of the seam 14 and the joinder of the tube 10 and endpiece 20. Also, the use of materials which readily adhere to the thermoplastic materials in the tube 10 should be avoided. A mandrel 30 of poly(tetrafloroethylene) as made by E.I. du Pont de Nemours and sold under the Trademark Teflon meets these considerations and has proven satisfactory in practice. The mandrel 30 also fits within and mates with the endpiece 20 and serves to position the tube 10 and endpiece 20 in the desired relationship. The tube 10, endpiece 20 and mandrel 30 are then slidably received within the shield designated generally by the numeral 40 and the end of the assemblage is placed within the base designated generally by the numeral 50. The design considerations mentioned in connection with the mandrel 30 are applicable to the base 50 and Teflon is therefore preferred for its construction. The base 50 cooperates with the mandrel 30 to hold the tube 10 and endpiece 20 in the requisite juxtaposition and contains an electromagnetic coil 56. The coil 56 is connected to an appropriate source of high frequency electrical energy, not shown. Such a high frequency source will typically be about 5 kilowatts at about 200 – 450 kilohertz as will hereinafter be described.

Figure 2:
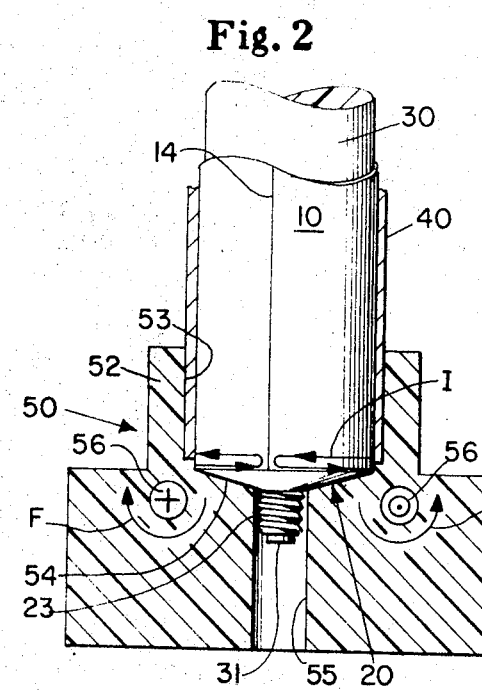
FIG. 2 is an elevational view, with the apparatus partially cut away, showing the parts of FIG. 1 in their in-use positions.
Figure 3:
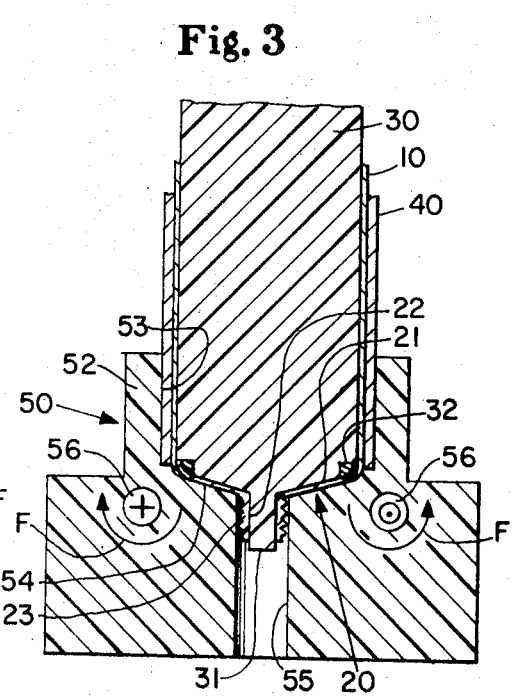
FIG. 3 is an elevational view similar to FIG. 2 in which both the apparatus and the tube are cut away.

Turning now to FIG. 2, the elements of FIG. 1 are shown, partially cut away for clarity, in their operative relationships. The base 50 includes a collar 52 having an axial cylindrical bore 53 therein into which the shield 40 is slidably received. The shield 40 is designed to closely fit about the tube 10, is preferably made of aluminum about one-eighth inch think and is preferably circumferentially continuous. If desired, the shield 10 can be permanently retained within the cylindrical bore 53. In either event, the shield 40 will be designed to cover and protect the tube 10, preferably extending at least about 2 inches therealong, but will terminate at a point generally short of (e.g., about one-sixteenth to one-eighth inch from and above as shown in FIGS. 2, 3 and 5) the skirt 25 of the endpiece 20 thereby allowing heating and sealing in the region of the skirt 25. The base 50 preferably is contoured in the region 54 to mate with and support the endpiece 20 and includes a tubular passageway 55 to receive the dispensing orifice of 22 the endpiece 20.

As shown in FIG. 2, the coil 56 is preferably comprised of a single turn of a suitable conductor such as three-sixteenths inch diameter copper tubing disposed near the region to be sealed. The shape and location of the coil 56 are not critical but a coil pattern geometrically similar to the transverse cross section of tube body is preferred. With cylindrical tubes 1.273 inches in diameter a coil 1.42 inches in diameter placed about one-sixteenth inch to one-eighth inch below the region to be sealed has proven satisfactory and such a geometry is assumed hereinafter. The coil 56 will encircle the tube 10 as completely as possible in order to provide a uniform magnetic field about the joint to be formed. The leads 57 of the coil 56 must be insulated and separated by a small amount, typically about 0.010 inch, in order to avoid arcing and undue capacitive losses therebetween.

Current in the coil 56 is designated by the arrow convention; the "X" designates the tail of the arrow with current flowing from the tail to the head of the arrow. Current in the direction shown produces a toroidial magnetic field with flux F having the directionality shown. The flux F, in turn, induces a current I in the metallic layer 11 of the tube 10. As will be appreciated by those skilled in the art, the induced current I encircles the region of the tube through which the flux F passes. Because of this pattern, the induced current flows along each of the edges of the metallic layer in the region of the seam 14. This current does not pose a problem in the region where the tube 10 and endpiece 20 are to be joined since the endpiece 20 provides a heat sink to avoid overheating the tube 10 in said region of joinder. In prior art devices, current in the portion of the seam 14 remote from the endpiece 20, is a problem as the heat resulting therefrom has no sink and consequently overheats said seam.

The use of the shield 40 effectively eliminates the long unsolved prior art problem of seam overheating when securing members typified by the collapsible tube body and endpiece. The shield is preferably made of a highly conductive material such as aluminum and, as mentioned, will typically be about one-eighth inch thick. Although the shield 40 need cover only the area of the tube 10 surrounding the seam 14, it is preferred to provide a shield which enwraps the entire tube. It appears that the shield 40 absorbs some of the energy which would be applied to the tube in the absence of the shield. Consequently, the tube is heated unevenly with a shield 40 which is not uniform; the portions of the tube which are comparatively unshielded overheat when sufficient energy is applied to heat and seal the comparatively shielded areas.

The mandrel 30 preferably includes a magnetic focusing means such as the ferite (i.e., inorganic salts of the formula $MFe_2O_4$ wherein M is a bivalent metal) ring 32 which aids in concentrating the flux F in the region to be sealed. Preferably, the ferite ring is essentially a 0.075 inch square in cross section as illustrated in FIG. 3 and is contoured to mate against the joint which is to be sealed. No special provision is necessary to provide cooling for the ferite ring when making collapsible dispensing tubes as described herein. Other materials having a high magnetic permeability may also be used, for example iron, nickel, cobalt and alloys thereof. The use of such a focusing means, alone, has proven to be inadequate to protect the seam 14 of the tube 10 from overheating.

EXAMPLE 1

With the complete apparatus hereinbefore described, including a full shield 40 and a ferite magnetic focusing means, a tube 1.273 inches in diameter consisting of 2 to 3 mils of aluminum with 5 mils of polyethylene bonded to the interior thereof (i.e., as the layer 12) and 2 mils of polyethylene bonded to the exterior thereof (i.e., as the layer 13) was bonded to an endpiece of polyethylene by application of about 5 kilowatts of energy at 248 kilohertz frequency for 1.1 seconds. A solid joint was formed and no noticable overheating and discoloration of the seam 14 occurred.

EXAMPLE 2

The procedure of Example 1 was repeated but the shield was not used. A reduced energy input of 3.5 kilowatts was used in an attempt to avoid overheating of the seam. With 2.3 seconds of energy application an acceptable joint was formed but the seam was discolored. Lower energy inputs did not produce acceptable joints.

EXAMPLE 3

The procedure of Example 1 was repeated using a shield which wrapped 45° about the tube on either side of the seam, 5 kilowatts of energy at 248 kilohertz frequency were applied for 0.9 seconds. No discoloration of the body seam was noted. Minor discoloration of the joint between the tube and the headpiece in the unshielded region, which did not affect the tube structurally, was noted.

EXAMPLE 4

The procedure of Example 1 was repeated using a mandrel without a magnetic focusing means. Application of 7 kilowatts of energy for 1.1 seconds produced an acceptable joint without discoloration of the seam.

EXAMPLES 5 THROUGH 8

The procedure of Example 1 was repeated with varying energy inputs, frequencies and times. In each case an acceptable joint was formed with no seam overheating.

| Example | Energy Input Kilowatts | Frequency Kilohertz | Time Seconds |
|---------|------------------------|---------------------|--------------|
| 5       | 7.5                    | 248                 | 0.85         |
| 6       | 9                      | 248                 | 0.75         |
| 7       | 7.5                    | 400                 | 0.83         |
| 8       | 7.5                    | 320                 | 0.85         |

After the desired amount of energy has been applied and the thermoplastic layer in the tube body has softened sufficiently, the tube 10 and endpiece 20 can be removed from the base 50 almost immediately (e.g., after about 0.25 second) and can be removed from the mandrel 30 after about 0.25 second. Thus, the present invention is well adapted to use in production line applications by using a plurality of mandrels on a turret or the like and a single base and induction heating means. Such an apparatus will produce about 45 tubes per minute.

In many applications of laminate collapsible dispensing tubes, it is desirable to provide an endpiece which includes a barrier to oxygen and water vapor superior to that provided by a polyethylene endpiece alone. It is now common practice to use polyethylene endpieces which are injection molded around or over an insert of urea or a laminate which includes aluminum as exemplified by U.S. Pat. Nos. 3,260,411 which issued July 12, 1966 to F. E. Dobson and 3,565,293 which issued Mar. 20, 1968 to R. S. Schultz. While such inserts are effective, incorporating them into the endpiece in the process of injection molding is somewhat complex and expensive. When assempling a tube according to the present invention, a barrier which includes a metallic susceptor layer may be assembled to the endpiece by induction heating at the same time the endpiece is being joined to the tube body. A particularly simple and satisfactory barrier to be applied in this manner consists of a frustoconical aluminum stamping which is adapted to mate with and cover the exterior of the endpiece.

Many other modifications of the invention can be made and it is not intended to limit the invention to the particular structures described, all reasonable equivalents thereof being intended to fall within the scope of this invention.

What is claimed is:

1. A method of sealing an endpiece to a tubular body, said body comprising a layer of metallic material and a layer of thermoplastic material and including a longitudinal seam, said seam providing circumferential electrical discontinuity in said metallic layer, said method comprising:
   A. placing said body in the desired relationship with said endpiece;
   B. shielding the portion of said body away from said endpiece with a conductive shield, said shield closely fitting about said body at least along said seam;
   C. applying heat to said metallic material in the region of said endpiece by means of an induction heating apparatus having a coil encircling said region, whereby the heat induced in said metallic material will melt said thermoplastic material; and,
   D. discontinuing the application of said heat thereby allowing said meltable nonconducting material to solidify and bond said body to said endpiece.

2. The method of claim 1 wherein said induction heating apparatus operates at a frequency of from about 200 kilohertz to about 450 kilohertz.

3. The method of claim 1 wherein said shield completely encircles said body.

4. The method of claim 1 including placing a magnetic focusing means within said body and adjacent said endpiece.

5. A method of sealing an endpiece to a tubular body, said body comprising a layer of metallic material and a layer of thermoplastic material and including a longitudinal seam, said seam providing circumferential electrical discontinuity in said metallic layer, said method comprising:
   A. placing said endpiece in the desired relationship with said body;
   B. shielding the portion of said body away from said endpiece with a conductive shield, said shield closely fitting about and completely encircling said body and placing a magnetic focusing means within said body and adjacent said endpiece;
   C. applying heat to said metallic material in the region of said endpiece by means of an induction heating apparatus operating at from about 200 kilohertz to about 450 kilohertz, said apparatus having a coil encircling said region, whereby the heat induced in said magnetic material will melt said thermoplastic material; and,
   D. discontinuing the application of said heat thereby allowing said thermoplastic material to solidify and bond said body to said endpiece.

6. An apparatus for sealing an endpiece to a tubular body said body comprising a layer of metallic material and a layer of thermoplastic material and including a longitudinal seam, said seam providing circumferential electrical discontinuity in said metallic layer, said apparatus comprising:
   A. A mandrel adapted to engage said body and said endpiece and hold the desired abutting relationship therebetween;
   B. An induction heating means including a coil encircling the region of abutment between said body and said endpiece; and
   C. A conductive shielding means disposed along said body at least in the region of said seam immediately adjacent said region of abutment.

7. The apparatus of claim 6 wherein said shielding means completely encircles said body in the region immediately adjacent said region of abutment.

8. The apparatus of claim 6 wherein said mandrel includes a magnetic focusing means located on the interior of said tube and adjacent said region of abuttment.

9. An apparatus for sealing an endpiece to a tubular body said body comprising a layer of metallic material and a layer of thermoplastic material and including a longitudinal seam, said seam providing circumferential electrical discontinuity in said metallic layer, said apparatus comprising:
   A. A mandrel adapted to engage said body and said endpiece and hold them in the desired abutting relationship said mandrel including a magentic focusing means located on the interior of said tube and adjacent the region of abuttment;
   B. An induction heating means including a coil encircling said region of abuttment between said body and said endpiece; and
   C. A conductive shielding means encircling said body in the region immediately adjacent said region of abuttment.

* * * * *